United States Patent Office 3,290,152
Patented Dec. 6, 1966

3,290,152
METHOD OF MAKING REHYDRATED
GLUTEN PRODUCTS
Warren E. Hartman, Worthington, Ohio, assignor to Worthington Foods, Inc., Worthington, Ohio, a corporation of Ohio
No Drawing. Filed Oct. 20, 1965, Ser. No. 499,083
19 Claims. (Cl. 99—17)

The present invention, which is a continuation-in-part of my co-pending patent application Ser. No. 244,574, filed December 14, 1962, and now abandoned, relates broadly to gluten rehydration procedures and products, and more specifically to the method of rehydration of wheat gluten and to the food products formed from same, as well as the procedures followed in forming such rehydrated wheat gluten into food products.

It is well known that the art of washing gluten from wheat flour is old, and that for years "washed gluten" has been used as the basic protein material in various protein foods of vegetable derivation to achieve a chewiness and texture which simulates that of meat and meat products. The washing of wheat flour to produce "washed gluten" requires too much time and equipment to make same commercially feasible for use in large scale production of high protein foods compounded to simulate meat and meat products.

In connection with the protein used in such foods, the quantity of the protein in a flour to produce same or in a prepared vital gum gluten is easily determined by analysis, but it is the quality of such protein which is exceedingly difficult to either predict or control. The quality characteristics of gluten depends not only on the inherent composition, the substances of which it is composed and how those are joined together, but also on the environment of the gluten material. The enmeshed starch granules occupy the largest amount of the space of the solids in the gluten environment. The effect of such starch is mostly that of a diluent in spreading the gluten fibrils so as to give a network of manageable strength. The percent of water may be even greater than the total solids content. Such water is absorbed by and adsorbed on the gluten fibrils. This water is a part of the gluten environment, and is probably of great importance because it also acts as a solvent and dispersing agent for sugars, salts, acids, alcohols, phosphatides, and other less known substances of the gluten complex.

Since gluten will hold a rather definite quantity of water for a given weight of dry gluten, the magnitude of the water held has sometimes been used as a quality measure, because usually the greater the weight of wet gluten as compared with the dry weight of the same quantity of gluten, the better is its quality. This, however, is far from an accurate test of gluten quality. Some other environmental factors which affect gluten quality are: mechanical manipulation, temperature, time of mixing, time of resting, pH of the water and flour, and the concentration and kind of electrolytes in both the water and the flour. The process of preparing hydrated or wet gluten, in accordance with the present invention and which will be hereinafter described, makes it possible for the first time to favorably modify and, to an appreciable degree, control all of these factors affecting gluten quality except for the inherent quality of the protein itself as found in the gluten.

There is presently available on the open market, in commercial quantities, dehydrated vital gluten or gum gluten, which is extensively used in bread doughs as a protein supplement to obtain improved physical characteristics and added nutritional value for the resulting bread items. This vital gum gluten is generally available commercially to the trade in finely divided form like flour. Such dehydrated vital gum gluten has not been previously used to obtain a gluten mass for use in high protein vegetable base foods or synthetic foodstuffs resembling, in finished form, meat or meat products, because it has yielded a gluten inferior in all respects to freshly washed gluten made from a good grade of flour. Moreover, it has lacked uniformity of moisture content after rehydration, and the hydration has never been as complete as with freshly washed gluten.

Equipment which has been used and/or recommended for dough mixing and which includes gluten rehydration has, in general, consisted solely of conventional dough mixers (both high and slow speed), ribbon blenders, batch mixers, planetary mixers, and other mixers which extend and develop the gluten containing mass. Such recommended equipment and procedures, so far as gluten rehydration is concerned, have been too time consuming and too difficult to execute for satisfactory commercial use except, perhaps, for the mixing of items such as bread dough. It is also to be noted that the gluten in the mass obtained through the use of such equipment and procedures unless highly diluted with starch, as in the making of bread products, is not uniform throughout a single batch, nor from batch to batch. It was a recognition of the above problems and difficulties concerned in the rehydration of gluten, and the complete lack of any thoroughly satisfactory commercial solution for same, which led to the conception and development of the present invention.

Accordingly, among the objects of the present invention is the provision of an improved process for the production of uniform quality rehydrated gluten from dehydrated vital gum gluten in a greatly reduced time.

Another object is to provide a process wherein the texture and/or quality of the rehydrated gluten may be predicted, modified, and controlled.

Another object is to provide a process whereby other ingredients may be uniformly incorporated in the gluten mass simultaneously with the rehydration of the vital gum gluten used in making the gluten mass.

A further object is to produce from rehydrated vital gum gluten (wheat gluten), with or without other ingredients, a high protein content product which is of predicted and controlled uniform texture and high quality.

Still further objects and advantages of the present invention will appear as the following detailed description proceeds.

Generally the present invention comprises not only the improved high protein food product made from rehydrated vital wheat gluten with or without added ingredients and which is of predicted and controlled uniform texture and high quality, but also the process involving intimately mixing the total water desired with the amount of dehydrated vital wheat gluten so rapidly and intimately that absorption and adsorption of the water takes place prior to the development and agglomeration of the gluten mass.

Modifying and/or supplemental ingredients may be added to the dehydrated vital wheat gluten prior to the agglomeration of the gluten mass. These materials will be incorporated uniformly and simultaneously with the development of the gluten mass as the present method is carried out and will produce the predetermined and desired variations in the physical characteristics and the nutritional value of the final product.

More specifically the present invention comprises, as part of same, the subjection of finely divided dehydrated vital gluten and water, together with or without modifying and/or supplemental ingredients, to the action of equipment not previously used for the rehydration and development of a gluten mass in manner producing a predicted and controlled uniform texture and high quality final product.

I have found that the universally used mixers of dough made from flour and vital wheat gluten are too slow and, moreover, do not produce a uniform quality rehydrated gluten nor one where other ingredients may be uniformly incorporated in the gluten mass simultaneously with the rehydration of the vital gum gluten used in making such gluten mass with a very high percentage of gluten. Moreover, a batch made in this manner is not homogeneous and batches vary from batch to batch so that it is impossible to produce a high-protein content product which is of predicted and controlled uniform texture and high quality. This problem is a serious one in the field of preparing high quality high protein content products simulating meat and meat products satisfactorily useable in the place of the latter. The preparation of these high protein vegetable base products from rehydrated wheat gluten is important in meeting the requirements of those who for various reasons, dietary and otherwise, cannot or should not eat meat as such but nevertheless need high protein food products in the place of such meat. In trying to find a solution to this problem, I have discovered that a completely different method and type of apparatus must be used in the rehydrating of vital gluten as well as in the blending of other items or ingredients with same to meet specfiic requirements.

The type of equipment which I have discovered to be wholly satisfactory for carrying out the present invention is one wherein the rehydration of the vital gluten and mixing with other ingredients is accomplished by keeping the body of material thoroughly broken up and agitated so that the water used in rehydrating the vital gluten, such as vital wheat gluten, is kept in contact with the fine gluten particles so that the rehydration can be uniform, and that if other materials are to be blended into the gluten mass, same can be done simultaneously with the rehydration during this rapid mixing, cutting, chopping, or beating of the mass substantially from the very first of the rehydration process, a thing which results in such added ingredients being uniformly and homogeneously blended throughout the gluten mass so that such gluten mass is not only uniform throughout the batch but also that similar batches are likewise uniform and do not vary appreciably from each other. A machine which I have found which makes possible for the first time the production of uniform quality rehydrated gluten, with or without other ingredients blended with same, is known by the trade mark name of a "Silent Hopper." This particular machine has been specifically designed for preparation of comminuted meat and has a bowl with a round bottom and a raised center portion of the bottom such that it has a bottom contour similar to the bottom half of a doughnut laid on its side. This bowl is rotatable about a central vertical axis, while mounted over the bowl at one side of the center of same is a rotary shaft in a plane perpendicular to the bowl shaft and with such shaft mounted over said bowl having mounted thereon closely spaced knives, the cutting edges of which closely fit the outer periphery of the inner surface of the bowl so that as this shaft and knives are rotated the knives will closely follow the inner periphery of the bowl along the outer edge portion of same and substantially full depth at the mid-portion of the knife-carrying length of the shaft.

In an example of the actual use of this special cutting or chopping apparatus in carrying out the present invention, the bowl was rotated at eight r.p.m. and the shaft carrying the cutter knives at 1750 r.p.m., with the mixing time being approximately five (5) minutes as given in the examples, although it is obvious that these speeds could be varied over a wide range so long as the cutting or chopping action is rapid enough to attain the intimate rapid mixing required in order that the fine particles of gluten being rehydrated are kept substantially separated so that the rehydrated water can get to those particles for thorough and uniform rehydration during the mixing procedure. In the slower speeds of operation a knife speed of rotation of approximately 1000 r.p.m. and a bowl speed of approximately 5 r.p.m. is about as low as the rehydration can be satisfactorily carried out, and here the rehydration time should be increased to approximately eight (8) or nine (9) minutes to obtain a uniform gluten mass of predictable physical characteristics. Where higher speeds are to be availed of, a maximum knife rotation speed of approximately 8000 r.p.m. and bowl rotation speed of 35 r.p.m. is about as high as rehydration in accordance with the present invention can be satisfactorily carried out. This is due largely to the mixing friction and the increased heat which is generated above these speeds, a thing which undesirably changes some of the characteristics and qualities of the final rehydrated gluten. At this maximum speed of knife and bowl rotation the rehydration time can be reduced slightly, perhaps to four (4) minutes. Where the speeds are somewhat higher, the rehydration time will be somewhat decreased, while somewhat slower speeds will require a somewhat longer rehydration time as noted above. Thus we have a maximum cutting knife rotation range of approximately 1000 to 8000 r.p.m. and a corresponding bowl rotation range of approximately 5 to 35 r.p.m. with the time of mixing being inversely of the rotation speeds with the slower speed taking approximately eight (8) or nine (9) minutes while the highest speed will take approximately four (4) minutes. A preferred range of speeds for the rehydration of the gluten and mixing of the ingredients would be 1400 to 3500 r.p.m. of the knives and a corresponding bowl speed of approximately 5 to 16 r.p.m. The time of mixing in this range of speeds would preferably be in the approximate range of 7 to 5 minutes. By the terms "cutting" or "chopping" this type of mixing and working of the gluten body is meant and not the old style stirring or kneading as is carried out in the working of bread doughs, which is not satisfactory for rehydrating vital wheat gluten and blending same with other ingredients in the formulation of a food product simulating meat or meat products.

In carrying out the rehydration process, as outlined above, desired modifications of the gluten mass can be readily accomplished; for example, the water or moisture content of the rehydrated gluten may be varied over a much wider range than has been possible with the standard practices previously used; for instance, the working range for water in accordance with the present improved procedures varies substantially between fifty and eighty percent of the finished mass. Still lower percentages of water, due to the more efficient absorption and adsorption of same by the vital gluten, results in a gluten mass which is so stiff and resistant to working that manipulation of the gluten mass becomes substantially impossible. On the other hand still higher percentages of water may be added to the gluten mass than usual but beyond that the water is not fully retained and, accordingly, some of the starch is washed out or lost from the gluten mass under those conditions. It should be noted further that the gluten mass varies from substantial toughness to increasing tenderness as the water content increases within the working range. Ease of cooking uniformly throughout also increases with the increases with the increased water content of the final rehydrated wheat gluten product.

As has previously been mentioned, the starch content of the gluten mass affects the quality of the gluten in the final product. This quality and the percentage of protein can be adjusted to various desired levels by the addition of patent wheat flour to the dehydrated vital wheat gluten. In practice, the protein variations in the product from eighty-plus percent (on dry basis) to as low as fifty percent (on dry basis) will produce a workable material. It should be noted, however, that the lower ranges are not wholly practical for the purposes intended because they are sticky and more characteristic of a flour dough used for the making of bread or bread products and not a true gluten mass useable for producing high protein foods simulating meat and meat products. It is thus easy to control the percentage of protein as well as the starch because the protein in the product formed from a mixture of vital wheat gluten and wheat flour varies substantially inversely to the amount of starch added to the vital wheat gluten.

There are several other ingredients which affect the final product and may be thoroughly blended into the gluten mass during the rehydration of the vital wheat gluten in accordance with the present invention, and among them are the following: (1) Phosphatides such as lecithin, which is extremely important in effecting the physical properties of the gluten mass and the range of use is quite critical. For instance, the addition of as little as 0.05% will produce noticeable tenderness of the final product, while 0.25% will produce gluten which is very much softer than normal, and additions as high as 4% will almost completely destroy the tenacity of the final product. (2) Fats, fatty acids, and oils in small amounts also exhibit this effect on the gluten mass. (3) Proteolytic and amylolytic enzymes (e.g. papain, bromelin, pepsin, trypsin, amylases, et cetera) in small amounts likewise exhibit this effect on the gluten mass. (4) Hydrolyzing chemical agents suitable for use in foods, such as small amounts of hydrochloric acid, sodium sulphide, alkaline hydroxides, et cetera, will produce partial hydrolysis in the gluten mass. The physical characteristics of the gluten mass to which such hydrolyzing agents have been added, are to a degree, a function of the pH of the gluten mass. Therefore pH adjustment and control in the final product is desirable. The gluten is most coherent and elastic at a pH of 5.1, which is also the iso-electric point of the gluten. Variations within the pH range of approximately 4 to 8 produce desired variations in the physical characteristics of the gluten, while outside this range apparent breakdown or hydrolysis takes place, and which is greater the more the pH range is exceeded in either direction.

There are also ingredients which may be added to the vital wheat gluten containing mixture and yet will have little or no effect on the physical characteristics of the gluten mass but which may be very advantageously added to same substantially simultaneously with the rehydration of the vital wheat gluten in accordance with the present invention. In fact the incorporation of any ingredient into the gluten mass after it is developed is normally impossible, and it is exceedingly difficult to effectively accomplish such addition by any other method than the simultaneous addition with the other ingredients substantially at the start of the rehydrataion of the vital wheat gluten in accordance with the carrying out of the present invention. While such additives do not markedly alter the physical properties of the rehydrated wheat gluten, they can be used to add to the nutritional values, appearance or eye appeal, and modify the protein content, texture and "mouthfeel" of the final gluten mass. This compound of vital gluten plus supplemental ingredients produces a modified preparatory protein material suitable for use in the production of synthetic foodstuffs which simulate meat and meat products. The supplemental ingredients of this type are such as coloring materials, flavoring materials, vitamins, minerals, natural food substances, and proteins. In connection with the coloring materials, flavoring materials, vitamins, and minerals these are used in conventional small amounts to enhance the appearance, flavor, and quality of the final food products, the natural food substances are normally present up to a moderate amount, and the added proteins varying from a substantial but small amount to approximately the same amount as that of the rehydrated vital wheat gluten. So far as the added proteins are concerned, they may be in the form of powder, granules, spun fibers, extrusions, et cetera, depending upon the particular texture desired in the finished product in which the supplemental material is used.

The following two examples and formulas are given as typical compositions illustrating the carrying out of the present invention, but are not to be construed as placing any limitations on the scope of the present invention within the limits which have been defined above.

*Example I*

50 pounds of dehydrated vital gluten (80%+protein)
20 pounds of standard patent white flour (13% protein)
106 pounds of water @ 70° F.
280 grams caramel coloring
85 grams lecithin.

All of the above ingredients are placed in the bowl of a high speed cutting and chopping machine such as a "Silent Chopper" and the machine run for five (5) minutes with the bowl rotating at 8 r.p.m. and the cutter knives at 1750 r.p.m. This yields a uniform gluten mass of predictable physical characteristics, weight, and analysis which may be duplicated or modified as desired.

*Example II*

50 pounds of dehydrated vital gluten (80%+protein)
20 pounds of standard patent white flour (13% protein)
110 pounds of water @ 70° F.

The above ingredients are placed in the bowl of a high speed cutting and chopping machine such as a "Silent Chopper" with the bowl rotating at 8 r.p.m. and the cutter knives at 1750 r.p.m., and run for approximately twenty (20) seconds and then there is added to this mixture, 50 pounds of spun protein fibers such as produced under U.S. Patent No. 2,682,466.
1 pound of U.S. Certified Red Food Coloring (3% solution).
1 pound of imitation ham flavoring.

The cutting and chopping machine is then run for an additional five (5) minutes at the same speed. This will yield a textured gluten mass in which the protein fibers are impregnated in the gluten mass and tightly held by the gluten network. This is illustrative of the addition of supplemental ingredients to achieve a predetermined flavor, texture, and nutritional improvement of the gluten mass preparatory to use of same in high protein food items simulating meat and meat products.

It will be understood from the above description and examples that an almost infinite number of variations may be made to the process and products of same without departing from the spirit of the invention, providing that the fundamental principles of rehydrating the vital gum gluten, as set forth above, are followed.

Other modes of applying the principle of my invention may be employed instead of those explained, change being made as regards the methods herein disclosed, provided those stated by any of the following claims or their equivalent be employed.

I therefore particularly point out and distinctly claim as my invention:

1. In the manufacture of gluten base, high protein, uniform synthetic food products from a mixture comprising finely divided dehydrated vital gum gluten, and water in an amount producing the desired consistency of the gluten mass when finished, the improvement which consists of putting the ingredients together and substantially simultaneously rapidly cutting the mixture at high speed to keep the water and vital gum gluten particles in intimate mixture while the latter absorbs and adsorbs water, said high speed being about 1750 r.p.m.

2. In the manufacture of gluten base, high protein, uniform synthetic food products, the improvement which comprises adding water to a body of hydrateable material having a predetermined amount of finely divided dehydrated vital gum gluten, the amount of water being in the approximate range of fifty to eighty percent of the final product, and immediately upon addition of the water rapidly cutting the mixture at closely spaced points and at high speed so that the water and vital gum gluten particles are kept in intimate mixture while the hydrateable material absorbs and adsorbs water, said high speed being about 1750 r.p.m.

3. The method of making a uniform homogeneous gluten mass from a body of hydrateable material containing dehydrated vital gum gluten in finely divided form, which comprises adding water to said vital gum gluten in an amount sufficient to rehydrate said vital gum gluten, and simultaneously rapidly cutting said body of hydrateable material at closely spaced points and at high speed which keeps the water and vital gum gluten particles in intimate mixture while the latter rehydrates and the body of material absorbs and adsorbs said water, said high speed being about 1750 r.p.m.

4. In the manufacture of high protein synthetic food products having a gluten base, the improvement which comprises taking a body of finely divided hydrateable material including a predetermined amount of dehydrated vital gum gluten, adding water to said hydrateable material in an amount sufficient to rehydrate said vital gum gluten to the desired final consistency of the gluten mass when finished, and simultaneously rapidly cutting the mixture at closely spaced points and high speed whereby the water and vital gum gluten particles are held in intimate mixture while the latter absorbs and adsorbs water, said high speed being about 1750 r.p.m.

5. In the manufacture of gluten base, high protein, synthetic foods as set forth in claim 2, wherein said body of hydrateable material and water is continuously moved while the cutting of same takes place.

6. In the manufacture of high protein synthetic food products having a gluten base, the steps which comprise taking fifty pounds of finely divided dehydrated vital gluten, twenty pounds of standard patent white flour, one hundred six pounds of 70° F. water, eight-five grams of lecithin, and food coloring matter, placing the noted ingredients in a suitable receptacle, slowly rotating said receptacle at about eight r.p.m., and rapidly chopping the contents of the receptacle for approximately five minutes to keep the vital gluten of finely divided form in intimate mixture with said water to produce a uniformly rehydrated gluten base homogeneous high protein food product, said rapid chopping being at a speed of about 1750 r.p.m.

7. In the manufacture of high protein synthetic food products having a gluten base, the steps which comprise taking fifty pounds of dehydrated vital wheat gluten in finely divided form, twenty pounds of standard patent white flour and one hundred ten pounds of water at 70° F., placing same in a suitable receptacle, slowly rotating the receptacle at about eight r.p.m. while rapidly cutting the contents of the receptacle for approximately twenty seconds, then adding fifty pounds of spun protein fibers, coloring material, and flavoring material to said body of material in said receptacle, and continuing the high speed cutting of the rotating mixture for another five (5) minutes to keep the vital gluten of finely divided form in intimate mixture with said water to form a uniformly rehydrated homogeneous high protein, gluten network, food product with the spun protein fibers uniformly disbursed and firmly held by such network, said high speed being about 1750 r.p.m.

8. The method of rapidly and uniformly rehydrating dehydrated vital gum gluten, which comprises the steps of adding water to a body of dehydrated vital gum gluten in finely divided form and simultaneously rapidly chopping same to keep the body of finely divided vital gum gluten thoroughly broken up and agitated and the rehydrating water in contact with the vital gum gluten particles while the latter absorbs and adsorbs same, said rapid chopping being about 1750 r.p.m.

9. The method of rapidly and uniformly rehydrating dehydrated vital gum gluten, which comprises the steps of adding water in an amount which is substantially fifty to eighty percent of the finished product to a body of edible material containing at least fifty percent of dehydrated vital gum gluten in finely divided form and simultaneously rapidly chopping same to keep the body of finely divided vital gum gluten thoroughly broken up and agitated and the rehydrating water in contact with the vital gum gluten particles while the latter absorbs and adsorbs same, said rapid chopping being about 1750 r.p.m.

10. The method of making a food product suitable for use as a meat substitute having fifty to eighty percent protein on a dry basis from finely divided dehydrated vital gum gluten, flour, supplemental ingredients, and water in an amount which is substantially in the range of fifty to eighty percent of the finished product, which comprises the steps of adding said water to said ingredients, and simultaneously rapidly chopping same to keep the mixture and especially the body of finely divided vital gum gluten therein thoroughly broken up and agitated and the rehydrating water in contact with the vital gum gluten particles while the latter absorbs and adsorbs same, said rapid chopping being about 1750 r.p.m.

11. In the manufacture of gluten base, high protein, uniform synthetic food products in a rotary bowl with rotary knives closely fitting into same, the improvement which comprises adding water to a body of hydrateable material in said bowl, said hydrateable material having a predetermined amount of finely divided dehydrated vital gum gluten, the amount of water being in the approximate range of fifty to eighty percent of the final product, and immediately upon addition of the water rapidly cutting the mixture with said rotary knives at closely spaced points extending approximately to the bottom of said bowl and at high speeds so that the water and vital gum gluten particles are kept in intimate mixture while the hydrateable material absorbs and adsorbs water, the knife speed during said high speed cutting being in the approximate range of 1000 to 8000 r.p.m., and said bowl rotation speed being in the approximate range of 5 to 35 r.p.m.

12. In the manufacture in a rotary bowl, with rotary knives projecting to the bottom of same, of high protein synthetic food products having a gluten base, the improvement which comprises taking a body of finely divided hydrateable material including a predetermined amount of dehydrated vital gum gluten, adding water to said hydrateable material in an amount sufficient to rehydrate said vital gum gluten to the desired final consistency of the gluten mass when finished, and simultaneously rapidly cutting the mixture at closely spaced points and high speed whereby the water and vital gum gluten particles are held in intimate mixture while the latter absorbs and adsorbs water, said high speed of the knives being in the range of approximately 1400 to 3500 r.p.m., and of the bowl speed being in the range of approximately 5 to 16 r.p.m.

13. The method of rapidly and uniformly rehydrating dehydrated vital gum gluten in a rotary bowl with rotary knives projecting substantially to the bottom of same, which comprises the steps of adding water in an amount which is substantially fifty to eighty percent of the finished product to a body of edible material containing at least fifty percent of dehydrated vital gum gluten in finely divided form, and simultaneously rapidly chopping same to keep the body of finely divided vital gum gluten thoroughly broken up and agitated and the rehydrating water in contact with the vital gum gluten particles while the latter absorbs and adsorbs same, said rapid chopping involving a knife speed in the range of approximately 1400 to 3500 r.p.m., and a bowl speed in the range of approximately 5 to 16 r.p.m.

14. The method of making in a rotary bowl having rotary knives projecting substantially to the bottom of same, a food product suitable for use as a meat substitute having fifty to eighty percent protein on a dry basis from finely divided dehydrated vital gum gluten, flour, supplemental ingredients, and water in an amount which is substantially in the range of fifty to eighty percent of the finished product, which comprises the steps of adding said water to said ingredients in said bowl, and simultaneously rapidly chopping same to keep the mixture and especially the body of finely divided vital gum gluten therein thoroughly broken up and agitated and the rehydrating water in contact with the vital gum gluten particles while the latter absorbs and adsorbs same, said rapid chopping involving a knife speed in the range of approximately 1400 to 3500 r.p.m., a bowl speed in the range of approximately 5 to 16 r.p.m., and the chopping time in the range of approximately 7 to 5 minutes.

15. In the manufacture of gluten base, high protein, uniform synthetic food products from a mixture comprising finely divided dehydrated vital gum gluten, and water in an amount in the range of fifty to eighty percent of the final product, with the actual amount used being that producing the desired consistency of the gluten mass when finished, the improvement which consists of putting the ingredients together in a rotary bowl and substantially simultaneously rapidly cutting the mixture with rotary knives at high speed to keep the water and vital gum gluten particles in intimate mixture while the latter absorbs and adsorbs water, the bowl rotation speed being in the approximate range of 5 to 35 r.p.m., with the time of mixing being inversely of the rotation speeds and the knife speed during said high speed cutting being in the approximate range of 1000 to 8000 r.p.m.

16. In the manufacture of high protein synthetic food products having a gluten base, the improvement which comprises placing in a rotary bowl a body of finely divided hydrateable material including a predetermined amount of dehydrated vital gum gluten, adding water to said hydrateable material in an amount in the range of fifty to eighty percent of the final product, with the actual amount used being that sufficient to rehydrate said vital gum gluten to the desired final consistency of the gluten mass when finished, and simultaneously rotating said bowl while rapidly cutting the mixture with rotary knives at closely spaced points and high speed, whereby the water and vital gum gluten particles are held in intimate mixture while the latter absorbs and adsorbs water, the bowl rotation speed being in the approximate range of 5 to 16 r.p.m., with the time of mixing being inversely of the rotation speeds, and the knife speed during said high speed cutting being in the approximate range of 1400 to 3500 r.p.m.

17. In the manufacture of gluten base, high protein, synthetic foods as set forth in claim 16, wherein said bowl is of hollow upwardly opening annular shape with a central perpendicular axis, said bowl being adapted to hold said body of hydrateable material and water and to continuously move same while the cutting of said mixture takes place.

18. The method of rapidly and uniformly rehydrating dehydrated vital gum gluten, which comprises the steps of adding water to a body of dehydrated vital gum gluten in a rotary bowl with said gum gluten being in finely divided form and simultaneously rapidly chopping same with rotary knives to keep the body of finely divided vital gum gluten thoroughly broken up and agitated and the rehydrating water in contact with the vital gum gluten particles while the latter absorbs and adsorbs same, said bowl rotating in the range of approximately 5 to 16 r.p.m., with the time of mixing being inversely of the rotation speeds and the knife speed during said rapid chopping being in the range of approximately 1400 to 3500 r.p.m.

19. The method of rapidly and uniformly rehydrating dehydrated vital gum gluten in a rotary bowl with rotary knives closely fitting same, which comprises the steps of adding water to a body of dehydrated vital gum gluten in said bowl, said vital gum gluten being in finely divided form, and simultaneously rapidly chopping same with said rotary knives to keep said body of finely divided vital gum gluten thoroughly broken up and agitated and the rehydrating water in contact with the vital gum gluten particles while the latter absorbs and adsorbs same, the knife speed during said rapid chopping being in the range of approximately 1000 to 8000 r.p.m., the bowl speed in the range of approximately 5 to 35 r.p.m., and the chopping time in the range of approximately 8 to 4 minutes.

References Cited by the Examiner

UNITED STATES PATENTS

| | | | |
|---|---|---|---|
| 1,907,836 | 5/1933 | Lauterbur et al. | |
| 2,952,543 | 9/1960 | Szczesniak et al. | 99—14 |
| 3,093,483 | 6/1963 | Ishler et al. | 99—131 |
| 3,102,031 | 8/1963 | MacAllister et al. | 99—14 |

A. LOUIS MONACELL, *Primary Examiner.*

RAYMOND N. JONES, *Examiner.*

UNITED STATES PATENT OFFICE
CERTIFICATE OF CORRECTION

Patent No. 3,290,152 December 6, 1966

Warren E. Hartman

It is hereby certified that error appears in the above numbered patent requiring correction and that the said Letters Patent should read as corrected below.

Column 3, line 50, for "Hopper" read -- Chopper --; column 4, line 65, strike out "with the increases --.

Signed and sealed this 19th day of September 1967.

(SEAL)
Attest:

ERNEST W. SWIDER
Attesting Officer

EDWARD J. BRENNER
Commissioner of Patents